(12) United States Patent
Foster et al.

(10) Patent No.: US 9,049,348 B1
(45) Date of Patent: Jun. 2, 2015

(54) VIDEO ANALYTICS FOR SIMULATING THE MOTION TRACKING FUNCTIONALITY OF A SURVEILLANCE CAMERA

(75) Inventors: Rob Foster, Ramsey, MN (US); Steve Persian, Orono, MN (US)

(73) Assignee: Target Brands, Inc., Minneapolis, MN (US)

( * ) Notice: Subject to any disclaimer, the term of this patent is extended or adjusted under 35 U.S.C. 154(b) by 661 days.

(21) Appl. No.: 12/943,791

(22) Filed: Nov. 10, 2010

(51) Int. Cl.
*H04N 7/18* (2006.01)

(52) U.S. Cl.
CPC ...................................... *H04N 7/181* (2013.01)

(58) Field of Classification Search
CPC ................................ H04N 7/181; H04N 7/183
USPC ......................................... 348/143, 150, 169
See application file for complete search history.

(56) References Cited

U.S. PATENT DOCUMENTS

| | | | |
|---|---|---|---|
| 8,085,302 B2 * | 12/2011 | Zhang et al. | 348/169 |
| 2001/0010541 A1 * | 8/2001 | Fernandez et al. | 348/143 |
| 2002/0113872 A1 * | 8/2002 | Kinjo | 348/116 |
| 2006/0093190 A1 | 5/2006 | Cheng et al. | |
| 2006/0170769 A1 * | 8/2006 | Zhou | 348/143 |
| 2006/0187305 A1 | 8/2006 | Trivedi et al. | |
| 2006/0192675 A1 | 8/2006 | Renkis | |
| 2007/0013776 A1 * | 1/2007 | Venetianer et al. | 348/143 |
| 2007/0058717 A1 | 3/2007 | Chosak et al. | |
| 2007/0182819 A1 | 8/2007 | Monroe | |
| 2007/0285510 A1 | 12/2007 | Lipton et al. | |
| 2009/0225164 A1 | 9/2009 | Renkis | |
| 2010/0118147 A1 * | 5/2010 | Dorneich et al. | 348/155 |

OTHER PUBLICATIONS

Shi, Y. and Lichman, S., "Smart Cameras: A Review", Proc. Asia-Pacific Conference on Visual Information Processing, Hong Kong, Dec. 2005, pp. 95-100. [Actually presented on Dec. 12, 2005], 35 pages.

Mohan M. Trivedi, Ivana Mikic, S. Bhonsle, "Active Camera Networks and Semantic Event Databases for Intelligent Environments", IEEE Workshop on Human Modeling, Analysis and Synthesis (in conjunction with CVPR), Hilton Head, South Carolina, Jun. 2000, 8 pages.

\* cited by examiner

*Primary Examiner* — Chikaodili E Anyikire
(74) *Attorney, Agent, or Firm* — Nixon & Vanderhye P.C.

(57) ABSTRACT

In some implementations, a camera captures a video stream of a region of a business without panning or tilting, where the camera includes a field of view that identifies a portion of the region that is captured. An analytics system optionally analyzes the video stream to determine a path of a customer moving across the camera's field of view. In selected embodiments, an image display system can extract a subset of the video stream, where the subset of the video stream depicts the customer during substantially all of the customer's movement across the camera's field of view. A public facing monitor may present the subset of the video stream such that the system effectively emulates the output of a pan, tilt, zoom camera that is tracking the customer across the field of view.

25 Claims, 7 Drawing Sheets

VIDEO ANALYTICS FOR SIMULATING THE MOTION TRACKING FUNCTIONALITY OF A SURVEILLANCE CAMERA

BACKGROUND

Businesses, such as banks, government facilities, and commercial retail stores often use surveillance cameras to observe properties for safety and security purposes. Conventional surveillance cameras capture video images of an area, such as a section of a room, an exterior entranceway, or inside a vault, and transfer the images electronically to a recording device or monitor. In some circumstances, the recording device or monitor is located remotely from the surveyed location.

If the images are transferred to a remotely located monitor, security personnel observe the activities within the area, for example, without compromising the comfort and privacy of people located in the area. In some circumstances, a secondary monitor is positioned in the monitored area such that a person being monitored is aware of the contents of the video being captured.

The field of vision of a surveillance camera is typically configured to cover only static designated areas. Pan tilt zoom (PTZ) cameras offer security personnel additional control over the direction, angle, and zoom of the cameras, allowing some maneuvering of the field of vision within the monitored area. By controlling a PTZ camera, security personnel have the ability to follow the movements of activities by panning along with the motions of a person, group, or other moving object, zooming in upon an area of concern, or by simply panning back and forth or tilting up and down to take in a wider field of vision than made available by the security camera in a static configuration.

SUMMARY

In some implementations, a camera captures video images of a region of a business without panning or tilting, where the camera includes a field of view that identifies a portion of the region that is captured. An analytics system optionally analyzes the video stream to determine a path of a customer moving across the camera's field of view. In selected embodiments, an image display system can extract a subset of the video stream, where the subset of the video stream depicts the customer during substantially all of the customer's movement across the camera's field of view. A public facing monitor may present the subset of the video stream such that the system effectively emulates the output of a pan, tilt, zoom camera that is tracking the customer across the field of view.

In some implementations, the camera captures a video stream of an object other than a person. For example, the camera can capture a video stream of a pet moving through the business. In some implementations, the system does not capture the video stream until the camera detects movement in the camera's field of view. In certain embodiments, the public facing monitor presents advertisements or other customer messages when not presenting the subset of the video stream. The public facing monitor optionally presents advertisements or other messages while presenting the subset of the video stream.

In some implementations, a direction and a rate of the customer's movement (e.g., the customer's velocity) is identified, a function is determined that corresponds with the customer's movement, and the subset of the video stream is identified based on the function. In selected embodiments, each frame in the video stream is analyzed in order to identify a location of the customer in the frame, and the subset of the video stream is extracted based on the locations corresponding to the frames of the video stream.

The details of one or more implementations are set forth in the accompanying drawing and description below. Other features, objects, and advantages will be apparent from the description and drawings, and from the claims.

DESCRIPTION OF DRAWINGS

Like reference symbols in various drawings indicate like elements.

DETAILED DESCRIPTION OF ILLUSTRATIVE IMPLEMENTATIONS

Monitors, such as closed circuit television monitors, occasionally present video content to a customer that shows a portion of a retail store where the customer is shopping. Dynamically changing the portion of the retail store presented on the monitor by simulating pan, tilt, zoom (PTZ) functionality of a camera increases customer interaction with and awareness of the video content compared to presentation of the same portion of the retail store all the time.

For example, a camera in the retail store captures video content of a static region or area in the retail store based on the field of view (FOV) of the camera. The video content is analyzed to identify a customer moving across the camera's FOV and cropped video content selected from the video content is presented on a display, where the cropped video content follows the path of the customer as the customer moves across the camera's FOV.

The cropped video content is selected in order to provide the appearance that the camera has PTZ functionality when the camera does not have full PTZ functionality. For example, the physical camera capturing the video content is able to zoom in on a subset region of the static region but is unable to pan and/or tilt to change the FOV. By emulation of "zooming" in on a region or area in the captured video content and panning the selected region across the captured video content, the selected region provides the appearance that the camera has complete PTZ functionality.

In some implementations, the display presents advertisements, messages, and other types of information with the cropped video content. For example, the cropped video content includes a message that helps a customer find a specific product that the customer is looking for or indicates that guest assistance is coming to help the customer.

Figure 1:
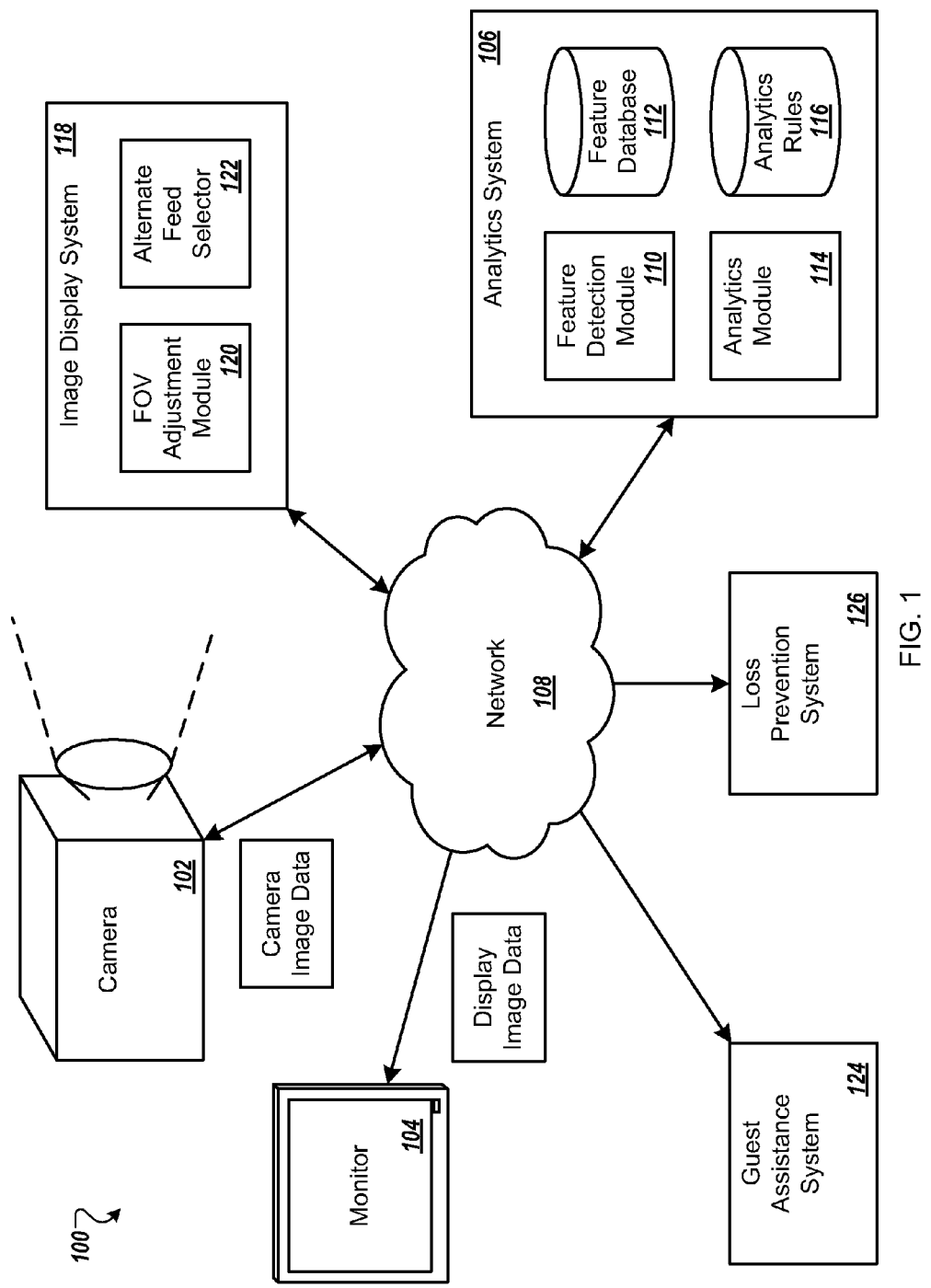
FIG. 1 shows an example of a system for presenting dynamic video content in a business.

FIG. 1 shows an example of a system 100 for presenting dynamic video content in a business. Some examples of businesses include offices, retail stores, gas stations, warehouses, and kiosks. The system 100 includes a camera 102 for capturing video content and a monitor 104, such as a closed circuit television or a public facing display, which presents a portion of the captured video content in order to emulate PTZ functionality that the camera 102 may not have.

The camera 102 and the monitor 104 are located in the same physical region of the business. For example, the camera 102 and the monitor 104 are the same device. In another example, the camera 102 and the monitor 104 are adjacent to each other or otherwise located in the same department of the business.

The camera 102 captures camera image data and sends the camera image data to an analytics system 106 through a network 108. The analytics system 106 is located at the same business as the camera 102. The network 108 is a local area network at the business. In other implementations, the network 108 is an intranet or the Internet that connects a plurality of businesses together. For example, the intranet connects businesses that are owned or associated with the same company, e.g., a retail store and an assets protection business employed by the retail store, and the analytics system 106 is located remotely from the business with the camera 102 (e.g., at the assets protection business).

The analytics system 106 receives the camera image data, e.g., a video stream, a video sequence, or video content, from the camera 102 and identifies individual images in the image data. For example, the analytics system 106 identifies the separate images or video frames in the video stream and the date and time that each of the separate images were taken (e.g., a timestamp associated with each of the images).

The analytics system 106 includes a feature detection module 110 that analyzes the individual images from the camera image data in order to identify one or more features in each of the individual images. The feature detection module 110 uses pattern recognition techniques to identify features in the images. For example, the analytics system 106 identifies the location of a customer in an image. In some implementations, the analytics system 106 identifies pictures of products sold by the business that are located in an image.

In some implementations, some of the images analyzed by the feature detection module 110 do not include any recognizable features or features that the feature detection module 110 is looking for. For example, when the feature detection module 110 receives an image of the business at night (e.g., when the business is closed) and there are no pictures of people in the image, the feature detection module 110 discards any features identified in the image. In another example, if the feature detection module 110 receives a blurry image or an image that is corrupted in some way, the feature detection module 110 discards the image and optionally requests another image from the camera 102.

The analytics system 106 stores information associated with the identified features in a feature database 112. For example, the analytics system 106 stores the image of the feature in the feature database 112 (e.g., the smallest portion of the image received from the camera 102 that includes the entire feature). In another example, the analytics system 106 stores an identifier in the feature database 112 that indicates features identified in an image. In one example, the analytics system 106 stores a Universal Product Code (UPC) or a product description in the feature database 112 for the product pictured in the image.

The feature database 112 includes information about the identified features and the images the identified features are located in. For example, the feature database 112 includes a mapping between image identifiers and the features indentified in the respective image.

In some implementations, the feature database 112 includes additional information about the images, such as the time the image was captured, and/or the camera that captured the image. In some implementations, the feature database 112 includes information that indicates that multiple features are related. For example, the feature database 112 includes information that relates all features identified from a single camera image.

In some implementations, the analytics system 106 stores feature position information in the feature database 112. For example, the feature detection module 110 identifies a feature in an image and the location of the feature in the image. The location information includes the x and y coordinates of the center of the feature with respect to the image the feature was detected in. In some implementations, the location information includes the width and height of the feature or the radius of a circle that circumscribes the feature. In some implementations, the feature detection module 110 stores the x and y coordinates of the upper left point of the feature and the lower right point of the feature. Alternatively, the location information is associated with an area that surrounds the feature instead of the smallest area that includes the entire feature.

An analytics module 114, included in the analytics system 106, analyzes the feature information stored in the feature database 112 in order to determine the video content to present on the monitor 104. For example, the analytics module 114 compares features stored in the feature database 112 to determine if an image of the same customer is located in multiple images captured by the camera 102. If the analytics module 114 identifies the same object, entity, item, or customer in multiple images, the analytics module 114 determines if the object, entity, item, or customer is moving across the FOV of the camera 102 so that video content of the movement can be presented on the display 104.

In some implementations, the analytics module 114 compares multiple features identified in a single image to determine a relationship between the features. For example, the analytics module 114 determines that a single image includes a picture of a customer and a picture of a product sold by the business. The analytics module 114 determines the relationship between the customer and the product, for example, by determining if the customer has picked up the product and/or is looking at the product. For example, the analytics module 114 determines that there is no relationship between the customer and a product the customer is not looking at. Similarly, the analytics module 114 determines a relationship exists between the customer and a product they are holding or have placed in their shopping cart.

The analytics module 114 identifies an action to take based on the features identified in the video content. For example, if the analytics module 114 identifies two or more related features, the analytics module 114 identifies a rule that is based on the related features and stored in an analytics rules database 116. The identified rule specifies a procedure for the system 100 to perform based on the two or more identified related features, such as a customer moving across the FOV of the camera 102.

For example, the analytics module 114 determines that a customer walked into a region of a business where the camera 102 is located. The analytics module 114 identifies multiple images from the camera image data that show the customer and determines, based on a rule associated with the customer entering the region, that a PTZ simulation of the camera 102 following the path of the customer should be presented on the monitor 104. The analytics system 106 identifies cropped video content that substantially includes the customer as the customer moves through the region and the cropped video content is provided to the monitor 104 through the network 108 such that the customer is able to view themselves in the cropped video content. For example, the customer is presented with a video on the monitor 104 of the customer walking through the region of the business, where the video content presented is a portion of the video content captured by the camera 102.

The system 100 includes an image display system 118 that controls the display image data provided to the monitor 104 and the settings of the camera 102 (e.g., zoom and focus). The image display system 118 is located at the same business as the camera 102, the monitor 104, and the analytics system 106. The image display system 118 receives messages from the analytics system 106 that indicate parameter adjustments for the camera 102 or video content adjustments for the monitor 104 based on the rule identified by the analytics module 114.

The image display system 118 includes an FOV adjustment module 120 that provides PTZ emulation for the system 100. The FOV adjustment module 120 identifies cropped video content to provide to the monitor 104 (e.g., display image data) where cropped video content is included in the video content received from the camera 102. The cropped video content includes the images of the object identified by the analytics module 114 as the object moves across the FOV of the camera 102.

For example, the camera 102 captures video content and the feature detection module 110 analyzes a portion of the video content to identify a current location of a customer image in the video content as the customer moves across the FOV of the camera 102. The analytics module 114 analyzes the feature information, including the current location of the customer image in the video content, to determine a rate and a direction of movement (e.g., the velocity) of the customer image.

The FOV adjustment module 120 uses the current location and the rate and direction of movement of the customer image in order to identify the projected location (e.g., in x and y coordinates) of the customer image in all of the frames of the video content. The FOV adjustment module 120 identifies cropped video content, included in the video content and based on the current and projected locations of the customer image, and provides the cropped video content to the monitor 104.

In some implementations, the analytics module 114 determines a function that fits or corresponds with the rate and the direction of movement (e.g., the velocity) of the customer image. In these implementations, the FOV adjustment module 120 uses the function to identify the cropped video content.

The image display system 118 selects the cropped video content by simulating PTZ functionality of the camera 102. For example, the camera 102 captures a video sequence of a static FOV, and zooming in on a portion of the captured video sequence allows the image display system 118 to pan, tilt, and zoom (e.g., zoom in and out) across the video sequence so that a customer perceives the camera 102 as having PTZ functionality when the cropped video content is presented on the display 104.

In some implementations, the analytics module 114 identifies the customer, object, entity, or item to follow based on attributes of the object. For example, the analytics module 114 follows moving objects that have an image size greater than a threshold value. For example, the analytics module 114 identifies an object that has a size smaller than the threshold size and determines that cropped video content of the small object should not be presented on the monitor 104. In another example, the analytics module 114 identifies an object with a size greater than or equal to the threshold size and determines that cropped video content of the object should be displayed on the monitor 104.

In one example, the analytics module 114 determines whether an object should be presented on the monitor 104 based on the velocity of the object. For example, the analytics module 114 follows an object that is moving at a velocity greater than a threshold velocity and does not follow objects moving at a velocity slower than the threshold velocity.

The analytics module 114 optionally identifies an object to follow based on the color of the object. For example, the monitor 104 presents cropped video content of an object with a color that is similar to the background color of the FOV of the camera 102 and does not present objects that have a color complementary to the background color. In another example, the monitor 104 presents cropped video content of an object with a color that is different from the background color of the captured video content.

In certain implementations, objects are presented on the monitor 104 based on the shape of the object. For example, the analytics system 106 determines that an object has a shape similar to the shape of a dog and the monitor 106 presents the object based on the determination. In another example, the analytics system 106 determines that the shape of an object is similar to a ball and the object should not be presented on the monitor 104.

In some implementations, the analytics module 114 periodically updates the customer's rate and direction of movement by analyzing additional features (e.g., the customer's image) extracted from the video content.

The feature detection module 110 optionally performs object recognition on each of the frames in the video content to determine a location of the object respectively for each of the frames. The FOV adjustment module 120 uses the location for each of the respective frames in order to zoom in on the object in the respective frame and provide the monitor 104 with a sequence of the frames (e.g., cropped video content) such that the object is presented on the monitor 104 during substantially all of the object's movement across the camera's FOV.

The FOV adjustment module 120 optionally changes the actual settings of the camera 102. For example, the FOV adjustment module changes the zoom and/or focus of the camera 102. The image display system 118 adjusts the settings of the camera 102 without any interaction or input from a user.

The image display system 118 includes an alternate feed selector 122 that identifies additional content to present on the monitor 104 in addition to the cropped video content. For example, the analytics module 114 determines that a customer is looking at a DVD that is currently on sale and the alternate feed selector 122 presents an advertisement for the DVD on the monitor 104 along with the display image data (e.g., the cropped video content).

The system 100 includes a guest assistance system 124 that receives assistance requests from the analytics system 106. The guest assistance system 124 is located at the same business as the camera 102 and the monitor 104. For example, the analytics module 114 determines that a customer has fallen and is in need of assistance. The analytics module 114 requests assistance from the guest assistance system 124 and indicates the physical position of the customer in the business.

In some implementations, the analytics system 106 continues to request assistance from the guest assistance system 124 until the analytics system 106 receives a response from the guest assistance system 124. In some implementations, the analytics system 106 continues to request assistance from the guest assistance system 124 until the analytics module 114 determines that an employee of the business is helping the customer (e.g., based on analysis of the camera image data).

In some implementations, the system 100 includes a loss prevention system 126 that receives messages from the analytics system 106 when the analytics module 114 identifies suspicious customer activity. A display (not shown) presents a notification associated with the message to a loss prevention employee so that the loss prevention employee can make the appropriate action. The loss prevention system 126 is located at the same business as the camera 102 and the monitor 104.

In some implementations, two or more of the systems in the system 100 are included in the same device. For example, the camera 102 includes the analytics system 106 and/or the image display system 118. In another example, the analytics system 106 resides on a server physically located at the loss prevention system 126.

In some implementations, one or more of the modules in the system 100 are included in another part of the system 100. In some implementations, the functionality of one or more of the modules in the system 100 is performed by a different module. For example, when the analytics module 114 identifies an object to follow, the analytics module 114 identifies the frames for the cropped video content. In one example, when the analytics module 114 determines that the zoom and/or focus of the camera 102 needs to be adjusted, the analytics module 114 sends a notification directly to the camera 102 indicating the adjustments.

In some implementations, some of the systems and/or modules in the system 100 are located remotely from the business where the camera 102 and the monitor 104 are located. For example, the analytics system 106 and the loss prevention system 126 are located at a central facility connected to multiple businesses, where each business includes an image display system (e.g., a version of the image display system 118) and a plurality of cameras and monitors.

Figure 2A:
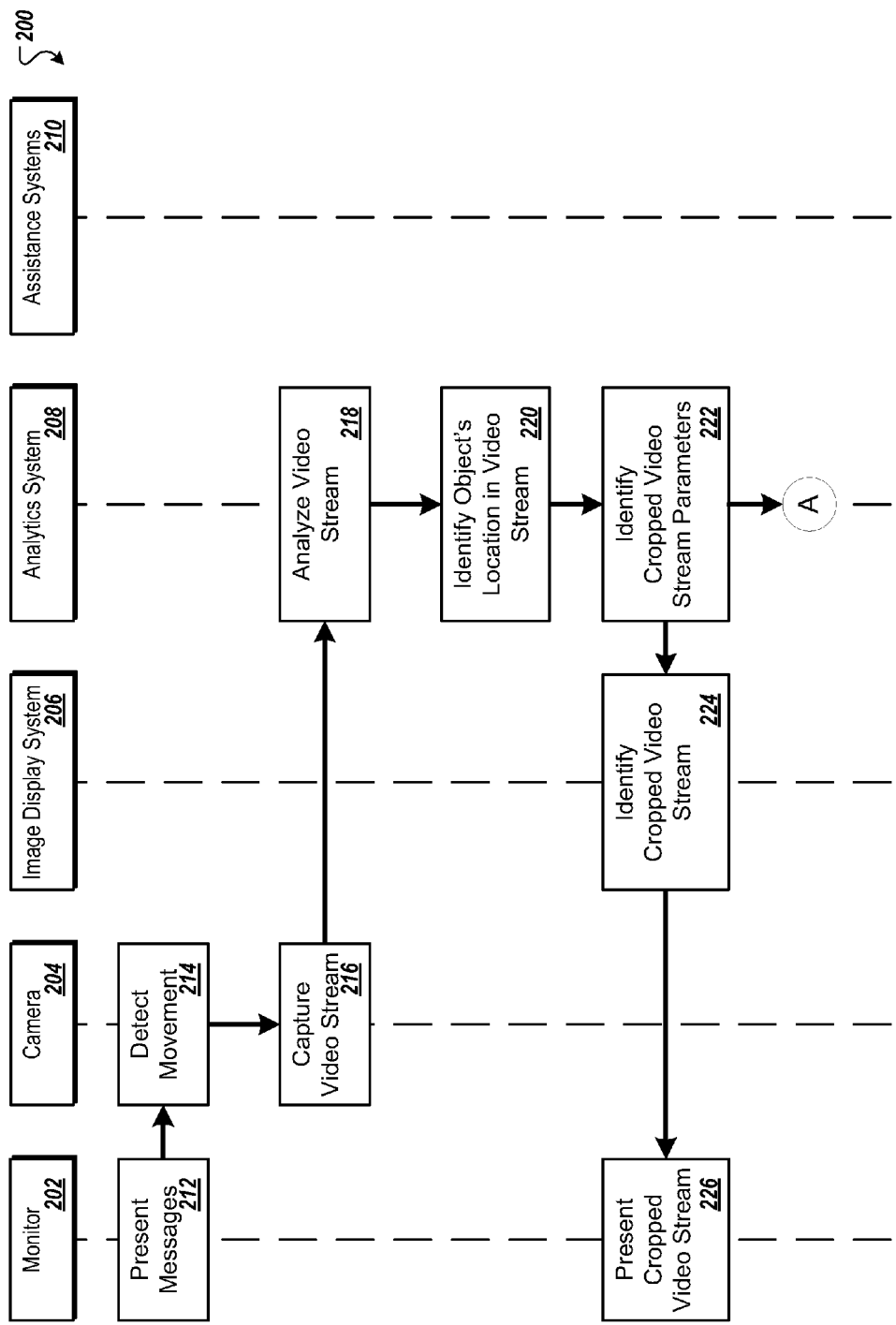
FIGS. 2A-B show a swim lane diagram of an example procedure for presenting video content.
Figure 2B:
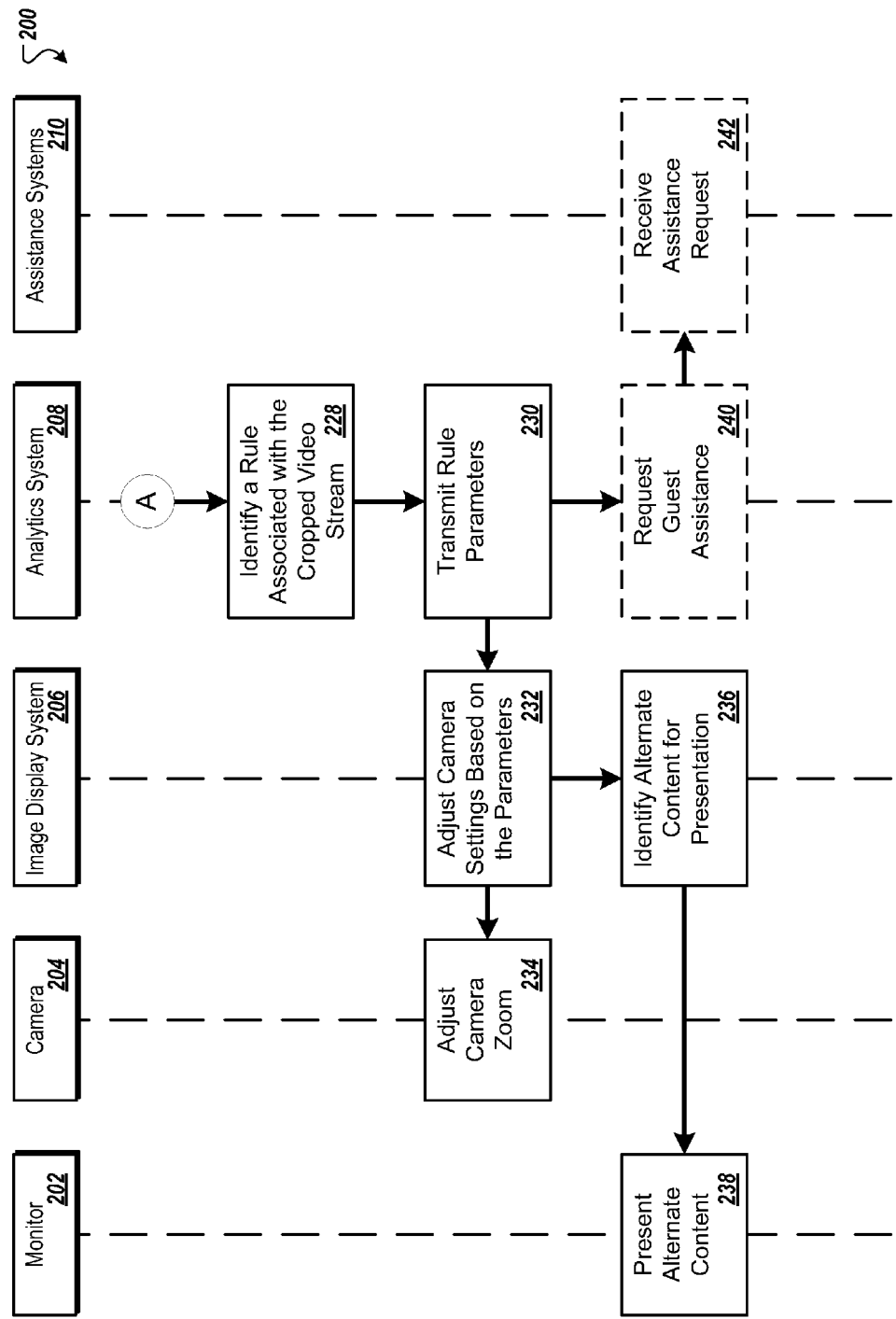

FIGS. 2A-B show a swim lane diagram of an example procedure 200 for presenting video content. The procedure 200 is used in a system, such as the system 100, to analyze features identified in frames of a video sequence (e.g., images) and present a cropped video sequence. In some implementations, a customer message is presented with the cropped video sequence.

A monitor 202 physically located in a physical region of a retail store presents content, such as a video sequence captured by a camera 204 located in the same physical region of the retail store. As used herein, a physical region of a retail store is a department, or an aisle, or includes a kiosk, a counter, or a table, to name a few examples.

An image display system 206 provides the monitor 202 with a simulated PTZ video sequence extracted from the video sequence captured by the camera 204. In some implementations, the image display system 206 is included in the same hardware as the camera 204.

An analytics system 208 analyzes the video sequence captured by the camera 204 to identify parameters for the simulated PTZ video sequence. For example, for each frame of the simulated PTZ video sequence, the analytics system 208 identifies the corresponding x and y coordinates of the frame in the respective frame of the video sequence captured by the camera 204.

The analytics system 208 receives one out of every thirty frames captured by the camera 204 in order to reduce the workload of the analytics system 208. In some implementations, the analytics system 208 receives the entire video sequence. In some implementations, the analytics system 208 analyzes all or a portion of the video sequence received from the camera 204.

The retail store includes one or more assistance systems 210 that communicate with the analytics system 208. For example, the retail store includes a guest assistance system that helps guests locate products that the guest is looking for.

The monitor 202 presents messages (212). For example, the monitor 202 presents advertisements for view by customers in the retail store. In some implementations, the monitor presents informational messages, such as where to locate products identified in an advertisement.

The camera 204 detects movement (214). For example, the camera 204 detects a customer moving into the FOV of the camera 204. Alternatively, the camera 204 provides a video sequence of images taken of the FOV to the analytics system 208 and the analytics system 208 detects movement in the camera's FOV.

The camera 204 captures a video stream (216). For example, based on the detection of movement, the camera 204 begins to provide a video stream of the camera's FOV to the analytics system 208. In some implementations, the video stream is stored on a network-connected database for access by the analytics system 208.

In some implementations, when the camera 204 is continuously capturing a video stream at all times, the camera 204 flags the time that motion was detected. For example, the camera 204 accesses a database that includes timestamps for the times where the camera 204 detected movement. For example, the database includes initial and terminal timestamps for when movement was detected and when movement was no longer detected respectively.

The analytics system 208 analyzes the video stream (218). For example, the analytics system 208 analyzes the video stream captured by the camera 204 when motion was detected. Alternatively, the analytics system 208 accesses the timestamp database and determines what portions of a continuous video stream to analyze.

In some implementations, the analytics system 208 determines a percentage of the video stream to analyze (e.g., a threshold number of frames taken each second to analyze). For example, the analytics system 208 determines that every tenth frame of the video stream should be analyzed. The analytics system 208 optionally requests only every tenth frame from the video stream database. Alternatively, the analytics system 208 receives the entire video stream and only analyzes every tenth frame of the video stream.

In some implementations, the video stream received by the analytics system 208 is a low-resolution video stream that includes the minimum number of frames needed for analysis by the analytics system 208. For example, the analytics system 208 analyzes every frame in the low-resolution video stream.

The analytics system 208 identifies an object's location in the video stream (220). For example, the camera 204 detected the movement of the object and provided the video stream to the analytics system 208 based on the movement. The analytics system 208 analyzes the video stream in order to identify the object that the camera 204 identified and the location of the object in the frames of the video stream.

The analytics system 208 identifies cropped video stream parameters (222). For example, the analytics system 208 identifies a sequence of location coordinates of the location of the object in the video stream. Each of the coordinate pairs (e.g., x and y coordinate pairs) in the sequence of location coordinates corresponds to a frame from the video stream.

In some implementations, the analytics system 208 identifies the location of the object in each of the frames of the video stream. For example, the analytics system 208 performs object recognition on the frames to identify the object moving across the FOV of the camera 204. For example, the analytics system determines that the object is a person, an animal, a product provided by the retail store, or another item. The analytics system 208 stores location information associated with the location of the object in each of the frames of the video stream.

In some implementations, the analytics system 208 analyzes some of the frames of the video stream to determine a rate of movement and a direction of movement of the object. For example, the analytics system 208 analyzes the first thirty frames of the video stream. The analytics system 208 fits a formula to the rate of movement and the direction of movement in order to predict the location of the object in frames that have not been analyzed. For example, the image display system 206 uses the formula to identify a predicted location of the object in the frames of the video stream.

The image display system 206 identifies a cropped video stream (224) based on the cropped video stream parameters. For example, the image display system 206 uses the actual or the predicted x and y coordinates of the object in order to extract the cropped video stream from the video stream captured by the camera 204.

In some implementations, when the analytics system 208 is not provided the entire video stream captured by the camera 204 or does not analyze the entire video stream, the image display system 206 extrapolates location information for the frames that were not analyzed based on the cropped video stream parameters identified by the analytics system 208. For example, when the analytics system 208 analyzes one out of every ten frames of the video stream, the image display system 206 uses the location of the object in the first and the eleventh frames to determine the location of the object in the intermediate frames.

The monitor 202 presents the cropped video stream (226). For example, the monitor 202 receives the cropped video stream from the image display system 206 and presents the cropped video stream for viewing by a customer, such as the customer moving through the FOV of the camera.

When the analytics system 208 is connected to multiple businesses, the analytics system 208 analyzes the video streams for each business separately. For example, the analytics system 208 receives camera image data from a first store and camera image data from a second store simultaneously. The analytics system 208 analyzes each of the video streams separately to identify location information associated with objects moving in the video streams.

The analytics system 208 identifies a rule associated with the cropped video stream (228). For example, the analytics system 208 determines that the customer walking through the FOV of the camera 204 is interacting with (e.g., holding or viewing) a product sold by the retail store and determines that a message related to the product should be presented on the monitor 202.

The analytics system 208 transmits rule parameters (230) to the image display system 206 and the image display system 206 adjusts camera settings based on the parameters (232) or another setting. For example, the image display system 206 provides the camera 204 with a message specifying setting adjustments and the camera 204 adjusts the camera's zoom (234). In some implementations, the camera 204 adjusts the focus of the camera 204 if the camera is out of focus or if the analytics system 208 needs a specific portion of the video stream to be in focus.

The image display system 206 identifies alternate content for presentation (236). For example, when the analytics system 208 determines that the customer is interacting with a product sold by the retail store, the image display system 206 identifies an advertisement for the product or product information to present on the monitor 202.

For example, the image display system 206 identifies an advertisement for a product the customer removed from a shelf. The image display system 206 presents the advertisement on a portion of the monitor 202 along with the cropped video stream. For example, the advertisement is presented as a picture within the video stream (e.g., "picture-in-picture") or on a bottom portion of the monitor 202.

In some implementations, when the analytics system 208 determines that the customer needs assistance (e.g., finding a product or bringing a product to a checkout counter) the image display system 206 identifies an assistance message to present to the customer. For example, the image display system 206 identifies a message that indicates that an employee of the retail store is coming to help the customer.

The monitor 202 presents the alternate content (238). For example, the monitor 202 presents the product advertisement or assistance message to the customer. In some implementations, the alternate content is presented at substantially the same time as the cropped video stream. In some implementations, the alternate content includes product comparison information. For example, the alternate content presents a comparison between the product the customer is holding and another similar product or a comparison between two similar products the customer is looking at.

The analytics system 208 optionally requests guest assistance (240). For example, the analytics system 208 determines that the customer has fallen or spilled a fluid on the floor and requests that an employee of the retail store help the customer. In some implementations, the analytics system 208 continues to monitor the customer to ensure that the customer receives appropriate assistance and advertisements are presented on the monitor 202.

The assistance systems 210 receive the assistance request (242). For example, an employee of the retail store receives the assistance request and responds to the request for assistance.

In some implementations, when product information is presented on the monitor 202, audible product information is played at the same time. For example, detailed product information or information about how to use a product is presented on the monitor 202 and played aloud.

Figure 3:
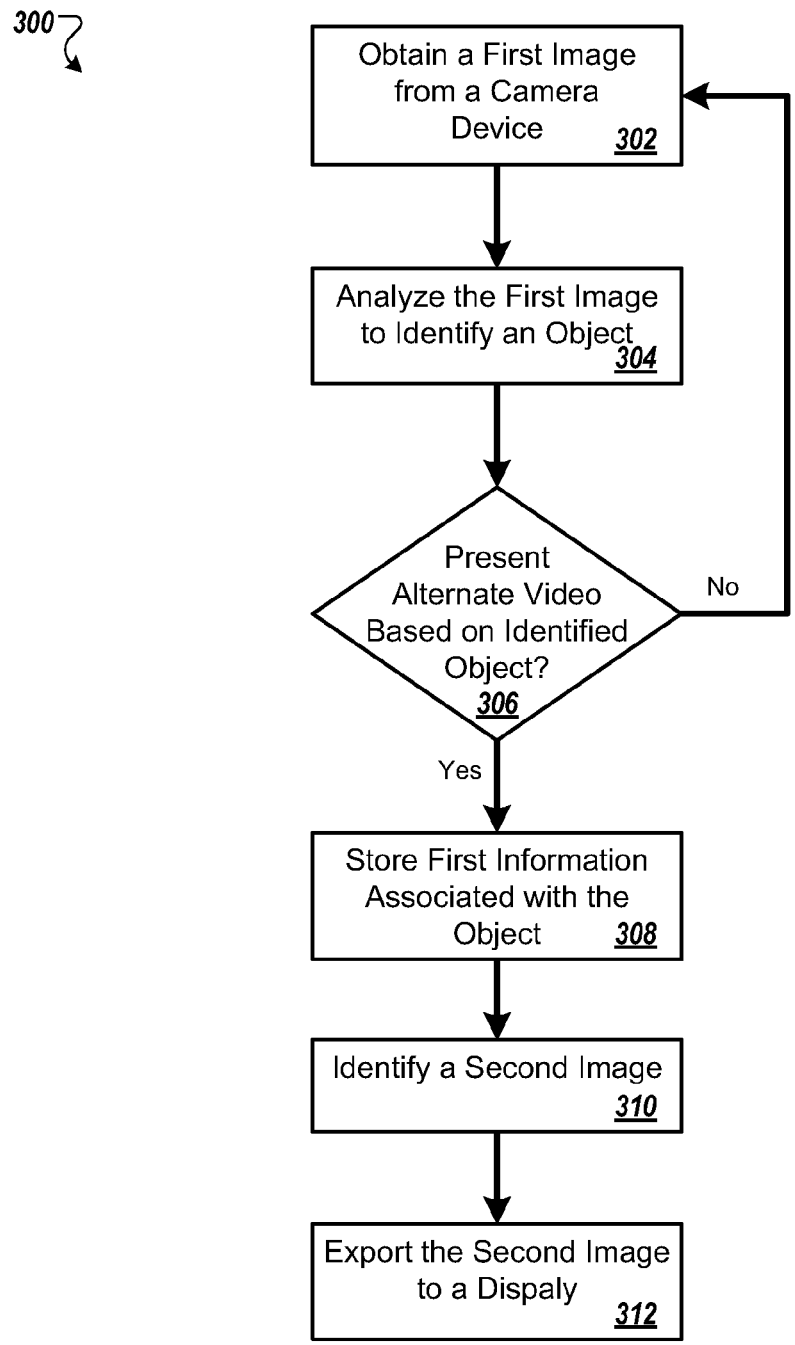
FIG. 3 shows a flow chart of an example process for providing a display image to a monitor.

FIG. 3 shows a flow chart of an example process 300 for providing a display image to a monitor. The system 100 and parts thereof will be referred to in the following as examples. In other implementations, the process 300 is performed by other systems in conjunction with or instead of the system 100.

An analytics system obtains (302) a first image from a camera device. For example, the camera 102 captures a stream of video in a retail store department and provides the video stream to the analytics system 106. The first image is a frame of the camera's FOV from the video stream. In some implementations, the camera 102 takes still frame snapshots at periodic intervals (e.g., thirty seconds apart) and provides one of the still frame images to the analytics system 106 as the first image.

The analytics system analyzes (304) the first image to identify an object in the first image. For example, the feature detection module 110 performs object recognition on the first image in order to identify an image of an object, such as a person, that is located in the first image.

The analytics system determines (306) if alternate video content based on the identified object should be presented.

For example, the analytics module 114 analyzes the identified object and determines if the object is a customer of the retail store.

If the analytics module 114 determines that the object is not an image of a customer, the analytics module 114 optionally discards (e.g., does not store in a database) information related to the object and the process 300 proceeds with step 302. Alternatively, the process 300 proceeds with step 304 and the feature detection module 110 identifies another object in the first image.

If the identified object is a customer, the analytics system stores (308) first information associated with the object. For example, the analytics system 106 stores information regarding the object's location in the first image. In some implementations, the analytics system 106 stores x and y coordinates of an area surrounding the object in the feature database 112. In some implementations, the analytics system 106 stores the x and y coordinates of the center of the object in the feature database 112.

The image display system identifies (310) a second image. For example, the FOV adjustment module 120 identifies the second image where the second image is cropped from the first image. The second image is based on the location of the object in the first image and the second image includes a portion of the image of the object. For example, the second image includes a portion of the customer walking through the FOV of the camera 102.

The image display system exports (312) the second image to a display. For example, the image display system 118 provides the second image to the monitor 104 and the monitor 104 presents the second image to the customer.

In some implementations, the second image is presented statically on the monitor 104. For example, a still image of the customer or another object is presented on the monitor 104.

In some implementations, the process 300 proceeds to step 302 to repeat the process 300 for another image taken by the camera 102. For example, the process 300 is repeated for each frame in a video sequence so that the monitor 104 presents a sequence of cropped frames that, when presented together, display the movement of the object through the camera's FOV.

In some implementations, when the analytics system 106 analyzes still images captured by the camera 102, the process 300 is performed for each of the still images. For example, the monitor 104 presents a sequence of still images corresponding to the images taken by the camera 102.

FIGS. 4A-D show examples of video content captured by a camera. The video content is captured by a camera, such as the camera 102, for presentation on a monitor in the same physical region as the physical location of the camera.

Figure 4A:
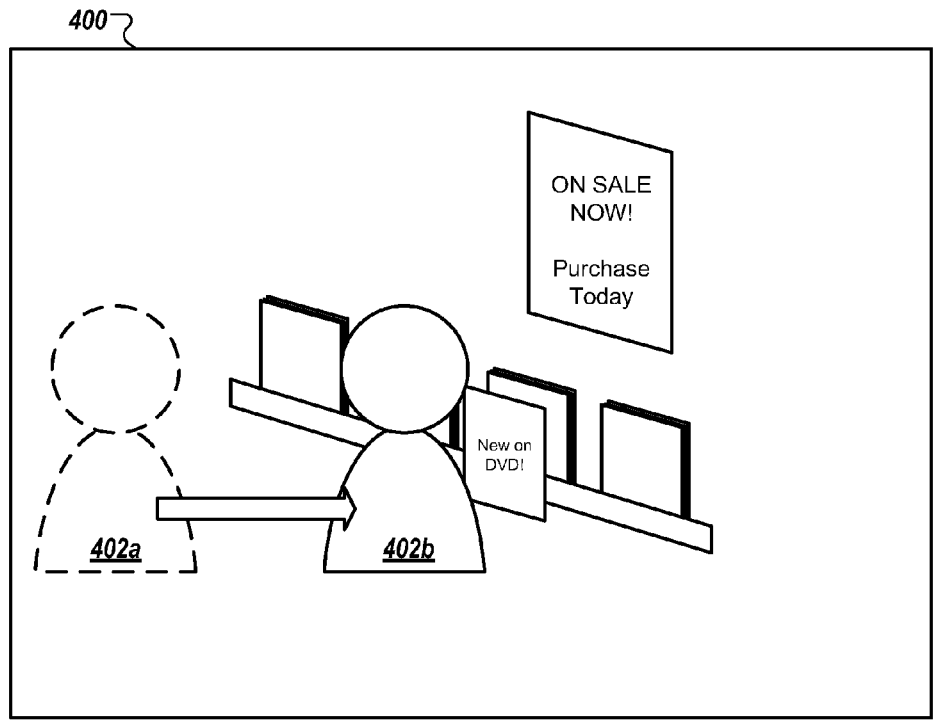
FIGS. 4A-D show examples of video content captured by a camera.

FIG. 4A shows an example of video content 400 captured by a camera device after the camera detected movement of an object. For example, a camera in a business detects movement in the camera's FOV and captures the video content 400. The video content 400 includes the movement of a customer from a first position 402a to a second position 402b. The camera captures the video content 400, including the first position 402a and the second position 402b without panning or tilting. In some implementations, the FOV of the camera does not change during capture of the video content 400.

The analytics system 106 identifies the customer and the customer's movement from the first position 402a to the second position 402b and provides location information to the image display system 118, as described in more detail above.

Figure 4B:
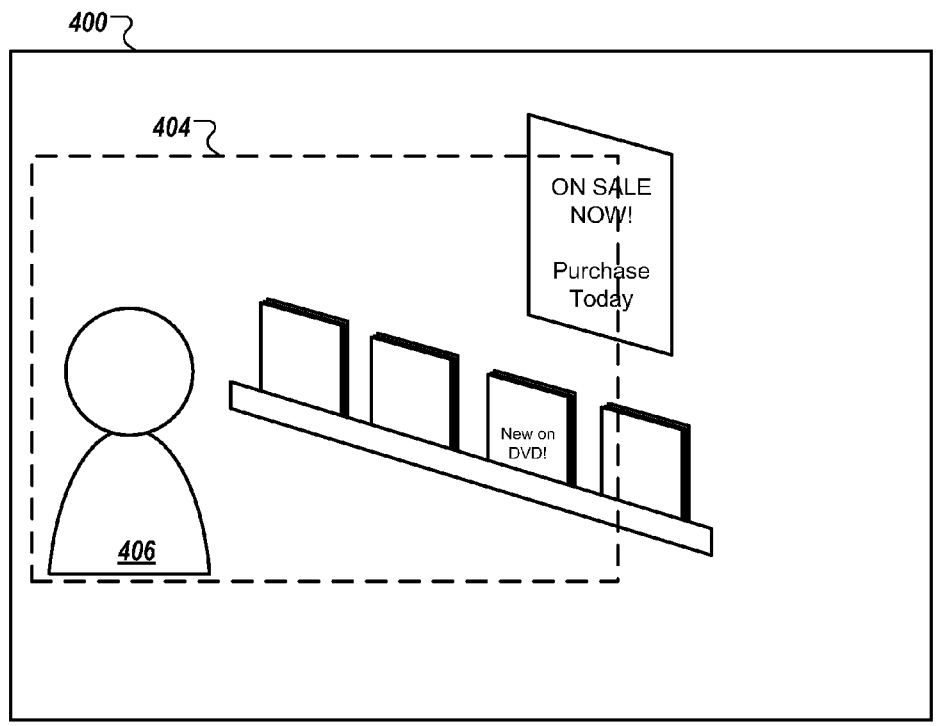

The image display system 118 uses the location information to identify a first cropped video frame 404 with the customer at an intermediate position 406, shown in FIG. 4B. For example, the intermediate position 406 is along the path of the customer from the first position 402a to the second position 402b but is not the second position 402b. In some implementations, the intermediate position 406 of the customer is the same as the first position 402a.

In some implementations, the image display system 118 identifies a sequence of cropped video frames that correspond with the movement of the customer along the path between the first position 402a and the second position 402b in the video content 400. For example, each of the video frames in the sequence is a cropped image corresponding with the video content 400 provided to the analytics system 106 by the camera 102.

Figure 4C:
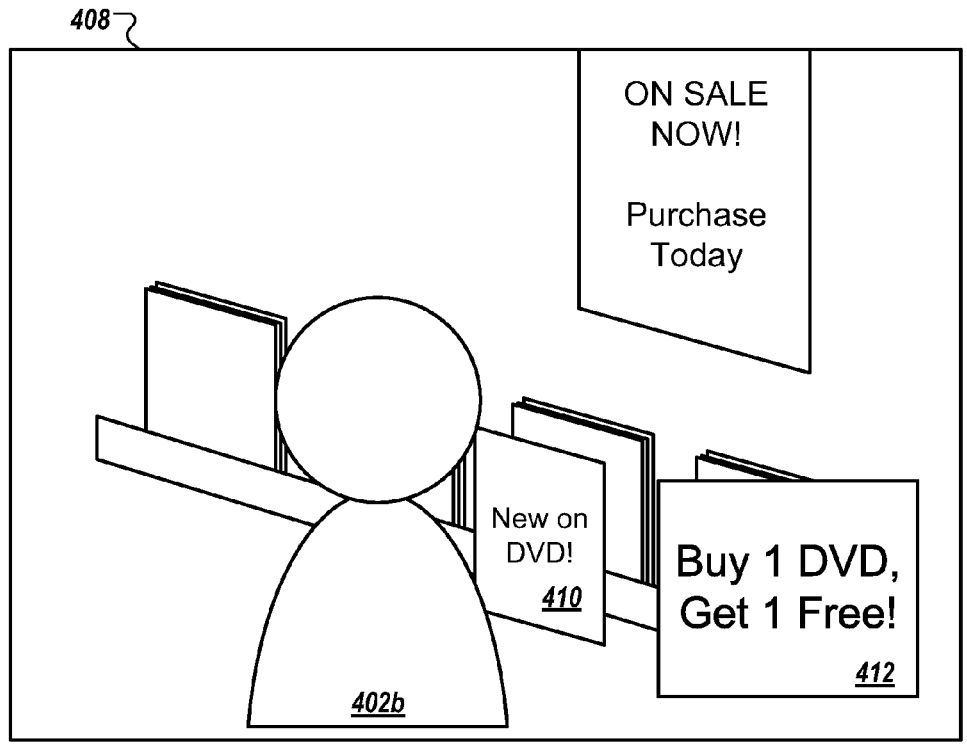

The image display system 118 identifies a second cropped video frame 408 that corresponds with the second position 402b of the customer in the video content 400, shown in FIG. 4C. The first cropped video frame 404 and the second cropped video frame 408, when presented together, depict the customer during at least a substantial majority of the customer's movement across the camera's FOV. In some implementations, the sequence of cropped video frames identified by the image display system 118 is presented with the first cropped video frame 404 and the second cropped video frame 408.

In some implementations, the image display system 118 presents one or more messages on the monitor 104 with the cropped video frames. For example, the analytics system 106 identifies a product the customer is viewing, such as a DVD 410, and a promotion related to the DVD 410. The analytics system 106 provides information (e.g., an advertisement identifier) about the promotion to the image display system 118 based on a rule associated with the DVD 410, and the image display system 118 presents an advertisement 412 (e.g., associated with the advertisement identifier) on the monitor, as shown in the second cropped video frame 408.

Figure 4D:
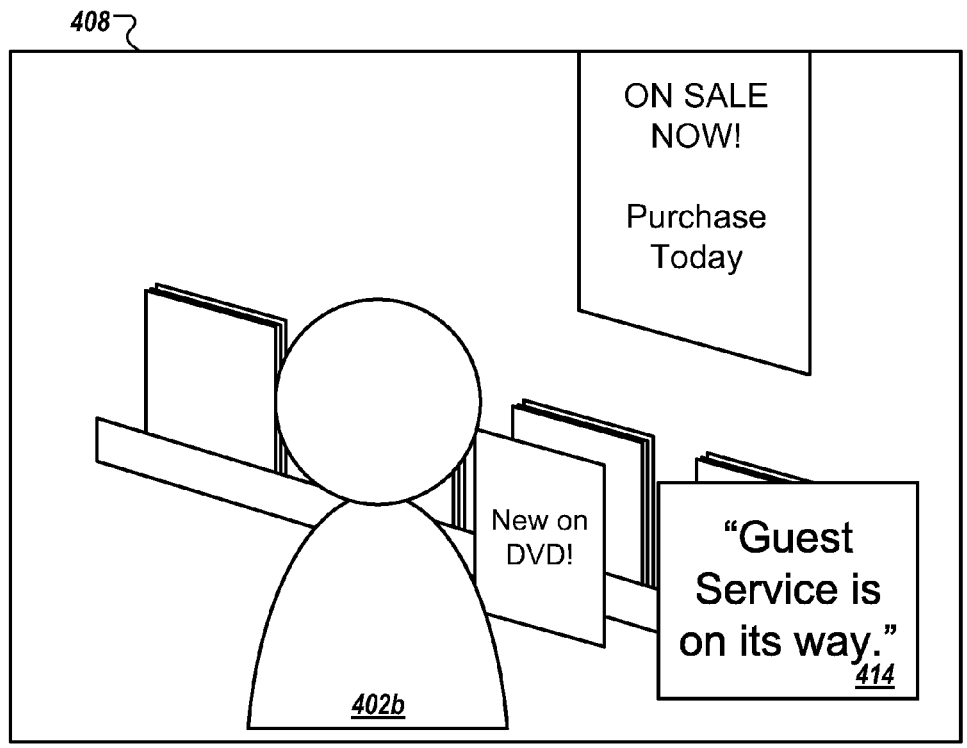

In some implementations, the analytics system 106 determines that a customer needs assistance and a guest assistance message 414 is presented with the second cropped video frame 408, as shown in FIG. 4D. For example, the analytics system 106 determines that the customer appears to need assistance selecting between two or more products and identifies an associated rule in the analytics rules database 116. The analytics system 106 requests guest assistance from the guest assistance system 124 and provides the image display system 118 with a notification indicating that the guest assistance message 414 should be presented on the monitor.

In some implementations, the monitor 104 presents multiple messages. For example, the monitor 104 presents two messages at the same time. In another example, the monitor 104 presents a sequence of messages with the cropped video content.

Figure 5:
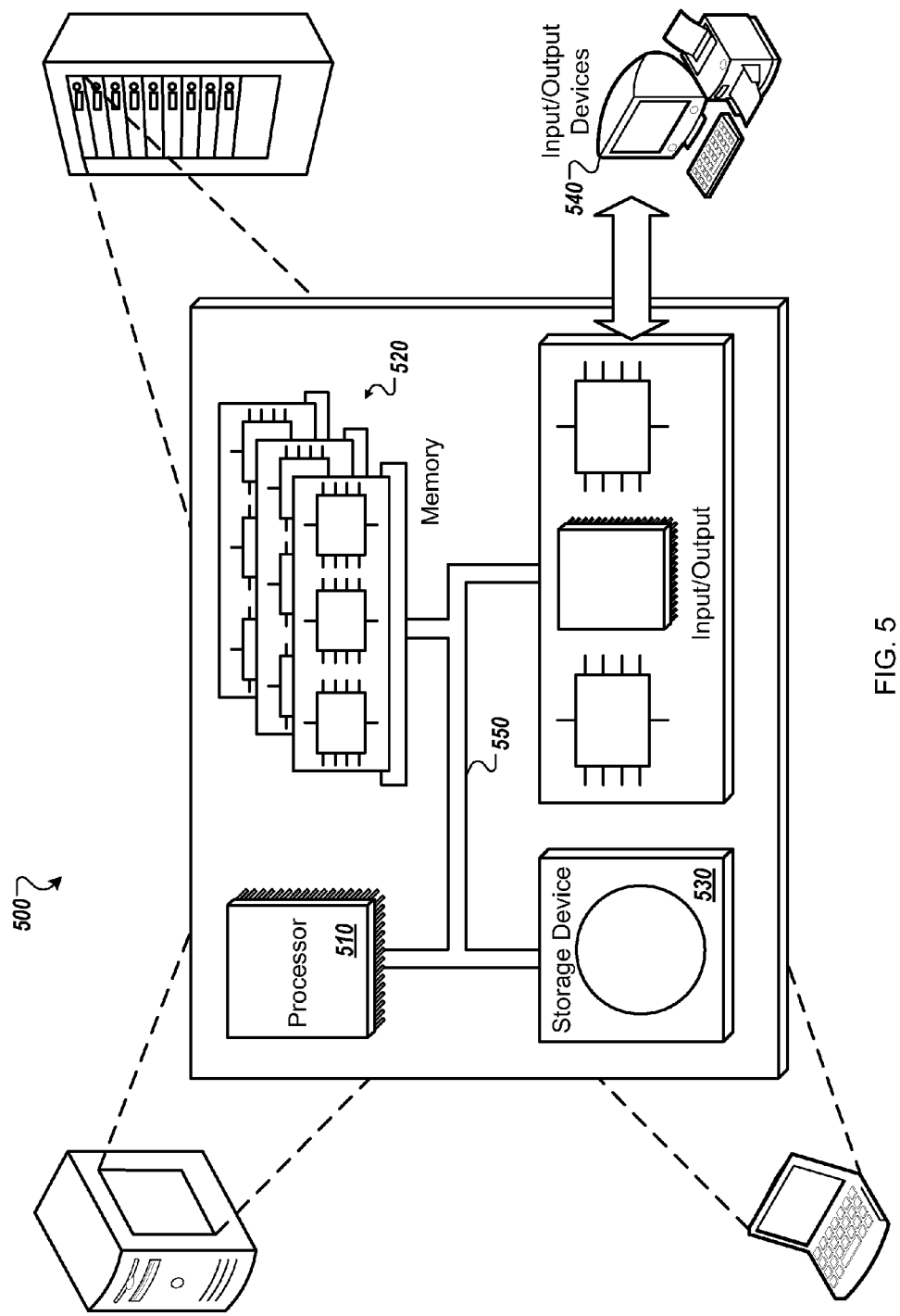
FIG. 5 is a block diagram of a computing system optionally used in connection with computer-implemented methods described in this document.

FIG. 5 is a schematic diagram of a generic computer system 500. The system 500 is optionally used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory including, by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method comprising:
receiving, from a camera, a first sequence of images of a retail environment, wherein a field of view of each of the images in the first sequence is the same as the field of view of the other images in the first sequence;
analyzing the first sequence of images to identify an object moving in the field of view;
analyzing the first sequence of images to identify a product for sale in the retail environment in the field of view;
determining a relationship between the object moving in the field of view and the product in the field of view;
identifying a rule previously stored in an analytics rules database associated with the object moving in the field of view and the product in the field of view and associated with the relationship between the object and the product, the rule specifying a procedure to be performed based on the analysis of the first sequence of images;
identifying a second sequence of images based on the rule associated with the object moving in the field of view, wherein each image in the second sequence is cropped from the first sequence of images such that each image in the second sequence is included within a respective image in the first sequence and each image in the second sequence includes the object;
displaying the second sequence of images on a public facing monitor, wherein the public facing monitor depicts the object during substantially all of the object's movement in the field of view; and
displaying content on the public facing monitor relating to the relationship between the object and the product.

2. The method of claim 1, wherein the analyzing comprises analyzing a subset of the first sequence of images to determine a current rate of movement of the object in the field of view and a current direction of movement of the object in the field of view and wherein the identifying comprises selecting the second sequence of images based on the current rate of movement of the object in the field of view and the current direction of movement of the object in the field of view.

3. The method of claim 1, wherein the analyzing comprises performing object recognition on each of the images in the first sequence to identify a position of the object in each of the images in the first sequence and wherein the identifying comprises selecting each of the images in the second sequence based on the position of the object in the respective image in the first sequence of images.

4. The method of claim 1, wherein the first sequence of images comprises a single first image, and displaying the second sequence of images comprises statically displaying a single second image on the public facing monitor, wherein the single second image is included within the single first image.

5. The method of claim 1, further comprising detecting movement of the object in the field of view and wherein the receiving is based on the detecting.

6. The method of claim 5, further comprising presenting an advertisement on the public facing monitor when no movement is detected in the field of view and wherein the displaying is based on the detecting.

7. The method of claim 5, wherein the camera and the public facing monitor are physically located in a region of the retail environment.

8. The method of claim 1, wherein the object comprises a person.

9. The method of claim 1, wherein displaying the second sequence of images comprises displaying a message on the public facing monitor, and wherein the message is overlaid on top of the second sequence of images.

10. A non-transitory physical computer-readable medium, embodied in a device, on which medium is encoded program code configured for execution by a processor to perform a method for identifying a sequence of images that simulate tracking functionality of an articulating camera, the method comprising:
  (a) receiving a sequence of first images, wherein the sequence of first images depicts a first area;
  (b) analyzing a portion of the sequence of first images to identify an entity moving across the first area;
  (c) identifying a sequence of second images, wherein the sequence of second images is a cropped portion of the sequence of first images and the sequence of second images includes the entity, wherein the analyzing comprises analyzing the sequence of first images to determine a velocity and direction of the entity across the first area, and wherein the identifying comprises selecting the sequence of second images based on the velocity and the direction of the entity across the first area;
  (d) when the velocity of the entity exceeds a threshold velocity, exporting the sequence of second images for presentation on a display;
  (e) when the velocity exceeds the threshold velocity, repeating steps (a) through (d) to present the sequence of second images so the display depicts the entity during at least a substantial majority of the entity's movement across the first area such that the sequence of said second images presented on the display simulates the tracking functionality of an articulating camera, wherein step (b) comprises predicting a location of the entity in the portion of the first images sequence not analyzed based on the velocity and the direction of the entity determined in step (c); and
  (f) precluding exporting of the sequence of second images when the velocity does not exceed the threshold velocity.

11. The medium of claim 10, wherein the entity comprises a human.

12. The medium of claim 10, wherein a first number of images in the sequence of said first images is less than a second number of images in the sequence of said second images.

13. The medium of claim 10, wherein the analyzing comprises performing object recognition on a sequence of said first images to identify a position of the entity in each of the images in the sequence of said first images and wherein the identifying comprises selecting each of the images in the sequence of said second images based on the position of the entity in the image from the sequence of said first images corresponding to the image in the sequence of said second images.

14. The medium of claim 10, wherein the exporting comprises selecting a message for presentation on the display, and wherein the display presents the message and the second image simultaneously.

15. The medium of claim 14, wherein the message comprises product information for a product associated with the entity.

16. A system comprising:
  a static camera device, wherein the static camera device is located in a region of a business, the static camera device is configured to capture a video stream of a field of capture of the static camera device wherein the field of capture includes a portion of the region, and the static camera device does not pan or tilt during capture of the video stream;
  a computer-implemented analytics system configured to analyze the video stream and determine a path of an item across the field of capture;
  an analytics rules database storing rules based on characteristics of the analyzed video stream;
  a computer-implemented image display system configured to identify a cropped video stream, wherein the cropped video stream is based on the path of the item across the field of capture and the cropped video stream is extracted from the video stream captured by the static camera device; and
  a closed circuit television configured to present the cropped video stream based on a rule previously stored in the analytics rules database associated with the item moving in the field of capture, the rule specifying a procedure to be performed based on the analysis of the video stream, the cropped video stream being presented while the object is moving across the field of capture, wherein the closed circuit television is located in the region of the business and wherein the cropped video stream from the static camera device emulates a tracking functionality of an articulating camera device when presented on the closed circuit television,
  wherein the analytics system analyzes a portion of the video stream captured by the camera device to determine a current rate of movement of the item across the field of capture and a current direction of movement of the item across the field of capture, and wherein the image display system identifies the cropped video stream by extrapolating location information for a non-analyzed portion of the video stream based on the path of the item identified from the analyzed portion of the video stream.

17. The system of claim 16, wherein the item comprises a human.

18. The system of claim 16, wherein the portion of the video stream analyzed by the analytics system comprises less than fifty percent of the video stream.

19. The system of claim 17, wherein the video stream captured by the camera device comprises a plurality of frames, wherein the cropped video stream comprises a plurality of cropped frames and each of the plurality of cropped frames corresponds to a respective one of the plurality of frames the cropped frame is extracted from, wherein the analytics system performs object recognition on each of the plurality of frames to identify a position of the item in the frame, and wherein the image display system identifies each of the plurality of cropped frames based on the position of the item in the frame corresponding to the cropped frame.

20. The system of claim 16, wherein the cropped video stream is presented on the closed circuit television based on the camera device detecting movement in the field of capture.

21. The system of claim 20, wherein the closed circuit television is configured to present a plurality of customer messages when the cropped video stream is not presented.

22. The method of claim 1, wherein the object comprises a customer, and
   wherein the step of determining a relationship between the object moving in the field of view and the product in the field of view comprises determining that the customer is interacting with the product while walking across the field of view, and wherein the step of displaying content on the public facing monitor comprises displaying a message related to the product on the public facing monitor.

23. The method of claim 22, wherein the step of displaying a message related to the product comprises displaying an advertisement concurrently with the second sequence of images on the public facing monitor.

24. The method of claim 1, wherein the object comprises a customer, and wherein the step of displaying content on the public facing monitor relating to the relationship between the object and the product comprises displaying a message that an employee of the retail environment is coming to help the customer.

25. The method of claim 1, wherein the object comprises a customer, and wherein the step of displaying content on the public facing monitor relating to the relationship between the object and the product comprises displaying product comparison information between the product and another similar product.

* * * * *